United States Patent
Beckley et al.

(10) Patent No.: US 8,195,718 B2
(45) Date of Patent: Jun. 5, 2012

(54) METHODS AND SYSTEMS FOR AGGREGATING CONTENT IN AN INSTANT MESSAGING SYSTEM

(75) Inventors: Kristina Beckley, Carlisle, MA (US); Mairead O'Hanlon, Dublin (IE); Yao Pang Alexis Song, Cary, NC (US); Smriti Talwar, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 12/394,291

(22) Filed: Feb. 27, 2009

(65) Prior Publication Data

US 2010/0223272 A1  Sep. 2, 2010

(51) Int. Cl.
*G06F 17/00* (2006.01)
(52) U.S. Cl. ........ 707/805; 707/804; 707/802; 707/796; 707/825; 707/721
(58) Field of Classification Search .................. 707/791, 707/792, 796, 802, 804, 825, 721, 805
See application file for complete search history.

(56) References Cited

U.S. PATENT DOCUMENTS

| | | | |
|---|---|---|---|
| 5,895,471 A | 4/1999 | King et al. | |
| 6,411,996 B1 | 6/2002 | Albers | |
| 7,479,949 B2 * | 1/2009 | Jobs et al. | 345/173 |
| 2003/0043186 A1 | 3/2003 | Libman | |
| 2003/0050815 A1 * | 3/2003 | Seigel et al. | 705/7 |
| 2006/0034266 A1 * | 2/2006 | Harris et al. | 370/356 |
| 2006/0177014 A1 * | 8/2006 | Skakkebaek et al. | 379/67.1 |
| 2006/0259462 A1 | 11/2006 | Timmons | |
| 2007/0271395 A1 | 11/2007 | Libman | |
| 2010/0069035 A1 * | 3/2010 | Johnson | 455/404.1 |

* cited by examiner

*Primary Examiner* — Sana Al Hashemi
(74) *Attorney, Agent, or Firm* — Cantor Colburn LLP; Daniel McLoughlin

(57) ABSTRACT

A method for content aggregation in an instant messaging system includes locating content of a specified type in an instant messaging log; organizing the located content by a parameter; and displaying the organized content. A system for content aggregation in an instant messaging system includes an aggregation module configured to locating content of a specified type in an instant messaging log; and a display module configured to organizing the located content by a parameter and to display the organized content.

8 Claims, 7 Drawing Sheets

200
```
AGGREGATE SPECIFIED CONTENT IN INSTANT MESSAGING LOG
                            201
```
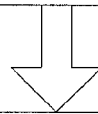
```
                ORGANIZE AGGREGATED CONTENT
                            202
```
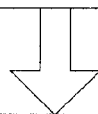
```
              DISPLAY ORGANIZED AGGREGATED CONTENT
                            203
```
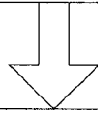
```
PERFORM AN ACTION REGARDING A SELECTED PIECE OF DISPLAYED CONTENT
                            204
```
FIG. 2

Chat History — 400

File  Edit  Tools  Help

- user1@hostA.com
- user2@hostB.com
- user3@hostC.com
- user4@hostD.com
- user5@hostE.com
- user6@hostF.com
- user7@hostG.com
- user8@hostH.com
- ⊖ user9@hostI.com
- user10@hostJ.com
- user11@hostK.com
- user12@hostL.com
- user13@hostM.com
- user14@hostN.com
- user15@hostO.com
- user16@hostP.com
- user17@hostQ.com
- user18@hostR.com
- user19@hostS.com
- user20@hostT.com
- user21@hostU.com
- user22@hostV.com
- user23@hostW.com
- user24@hostX.com
- user25@hostY.com Transcripts ▼         [       ] Search

12/18/07
12/6/07
12/5/07

■ User24
Senior manager, Renovations
Marketing
444-444/1-555-555-5555-6666
I am available (Sametime 7.5.1)

user24@h....    Hi, let me send you the link to our db
Me              ok
user24@h....    http://www.website.com/db123/

Saved Bookmarks ▼    Sort by Person ▼ — 407

[ Export ]   [ Tag ]   [ Save To... ]

User1
Today at 3:48 pm
http://www.yahoo.com/
4/11/08 at 11:01 pm
http://www.website.com/xyz/
4/4/08 at 9:56 am
http://www.website.com/abc/
4/3/08 at 7:52 am
http://www.website.com/def/    411

User2
3/15/08 at 10:00 am
http://www.website.com/abc/
3/6/08 at 10:00 am
http://www.website.com/def/

User3
12/28/07 at 10:00 am
http://www.website.com/abc/
12/14/07 at 10:00 am
http://www.website.com/def/

FIG. 4

METHODS AND SYSTEMS FOR AGGREGATING CONTENT IN AN INSTANT MESSAGING SYSTEM

BACKGROUND

This disclosure relates generally to the field of instant messaging.

Instant messaging, or chatting, has gained widespread popularity, and may be a valuable business tool because it allows users to exchange messages almost instantaneously over a network. An instant messaging system, which may be implemented on a computing platform such as a personal computer, a laptop, a personal digital assistant (PDA), and the like, may save instant messages as conversations or chat histories. The saved messages may contain information that a user may wish to reference at a later time.

Searching a repository, or log, of stored instant messaging conversations for specific content may present difficulties. Keyword-based or rich-text searching may be useful if the user recalls a unique keyword that was mentioned in the particular chat transcript. However, such searching is not useful if the user cannot recall the keyword or if the keyword is a common occurrence in the log. Further, if the user is searching for a uniform resource locator (URL, also known as a bookmark or link) or other content type, such as an image, audio file, or other file type, the user may not remember any specific words contained in the name of the content, as the name of the content may not be sufficiently descriptive. If a keyword or rich-text search does not locate desired content, the user may manually browse their instant message log. However, manual browsing may be burdensome if the user does not recall the sender or date of the content, or if the instant message log is large.

BRIEF SUMMARY

An exemplary embodiment of a method for content aggregation in an instant messaging system includes locating content of a specified type in an instant messaging log; organizing the located content by a parameter; and displaying the organized content.

An exemplary embodiment of a system for content aggregation in an instant messaging system includes an aggregation module configured to locating content of a specified type in an instant messaging log; and a display module configured to organizing the located content by a parameter and to display the organized content.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 2 illustrates an embodiment of a method for content aggregation in an instant messaging system.

FIG. 4 illustrates an embodiment of an instant messaging system incorporating content aggregation.

DETAILED DESCRIPTION

Embodiments of systems and methods for content aggregation in an instant messaging system are provided, with exemplary embodiments being discussed below in detail.

Aggregation of specified content types that are sent through instant messages enables a user to quickly locate content in an instant messaging log. Content types may include but are not limited to URLs, Lotus Notes database URLs, web conference URLs and passwords, phone numbers, audio conferences and passcodes, images, audio files, video files, or shared folders. The aggregated content may be identified and organized in a list. The list may be sorted by, for example, sender, receiver, date, or file type. The user does not need to manually search through a chat log, which may be large, or guess at a sender or receipt date of a particular content item to find the relevant instant messaging transcript, as the content is presented in a separate, aggregated list. The types of content that are aggregated may be extensible, may be configurable by the user, and may include any file type that may be sent or received via an instant message. A user may view, browse, or search the aggregated content by attributes including but not limited to sender, receiver, date received, date sent, name of file, keyword in adjacent text, tags, or content type.

Various actions may be available to the user, such as exporting, saving, resending, or tagging a particular pieces of content selected from the aggregated content. Content may be exported to a memory location or to an application, which may be located on a local file system or a remote computer. For example, a URL may be exported into a web browser bookmark menu, or to a bookmark sharing site. An image may be uploaded to a photo sharing service. A file may be saved into a specified memory location on a user's file system. A user may tag content for filtering purposes, or for exporting to other services that support tags. A user may forward a piece of content to someone else on their contact list through chat, e-mail or some other form of communication. The user may also view the context in which the content was sent or received by opening the chat transcript surrounding a piece of content. The above actions may be applied to one or multiple pieces of content.

Figure 1:
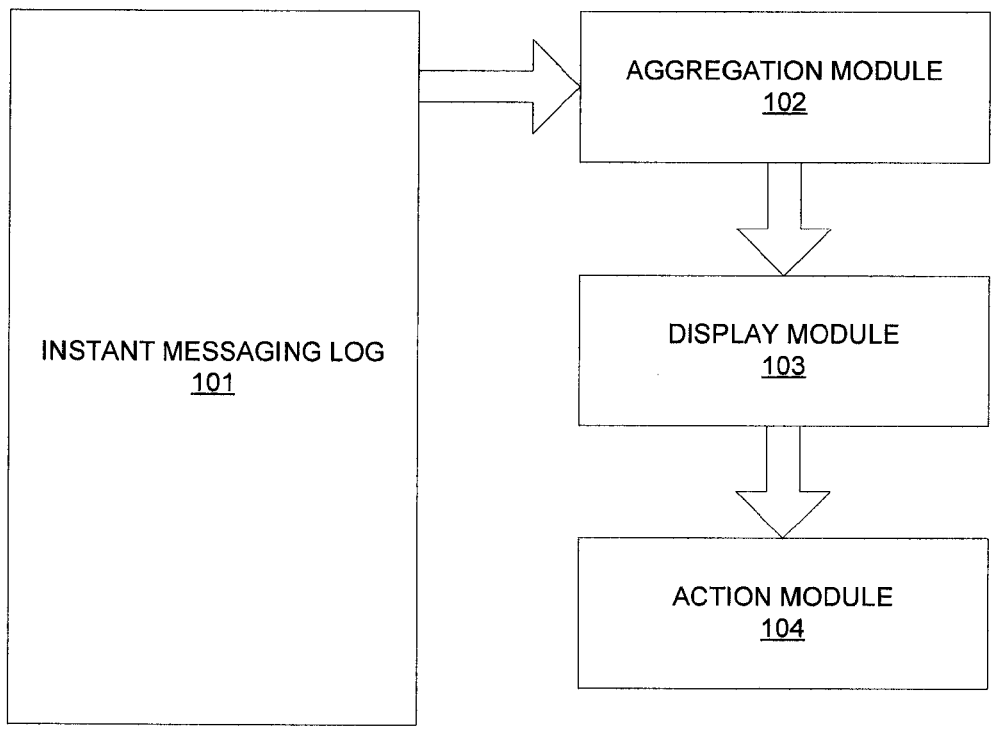
FIG. 1 illustrates an embodiment of a system for content aggregation in an instant messaging system.

FIG. 1 shows an embodiment of a system 100 for aggregation of content in an instant messaging system. Instant message log 101 comprises stored text, files, or other content sent or received by an instant messaging system. Aggregation module 102 searches the instant messaging log 101 for a specified type of content, and compiles an aggregated list of content of the specified type located in the instant messaging log. The specified type of content to be aggregated may include but is not limited to media files, images, URLs, or phone numbers. The specified type of content may be configurable by a user. Display module 103 filters the aggregated content list compiled by aggregation module 102 according to parameters that may be selected by the user, such as sender name or date. The display module 103 displays the filtered aggregated content to the user on, for example, a display device connected to a computer (not shown). Action module 104 performs a selected action, including but not limited to exporting, saving, uploading, tagging, or forwarding, regarding a specified piece of displayed content, as directed by the user.

FIG. 2 shows an embodiment of a method 200 for aggregation of content in an instant messaging system. In block 201, content of a type specified by a user, which may include but is not limited to media files, images, URLs, or phone numbers, is located in an instant messaging log, and an aggregated list of content of the specified type located in the instant messaging log is compiled. In block 202, the aggregated content is organized by a parameter that may be specified by user, such as by sender or by date of receipt. In block 203, the organized aggregated content is displayed to a user. In block 204, the user may perform an action regarding a selected piece of the displayed content, including but not limited to exporting, saving, uploading, tagging, or forwarding the selected piece of displayed content.

Figure 3:
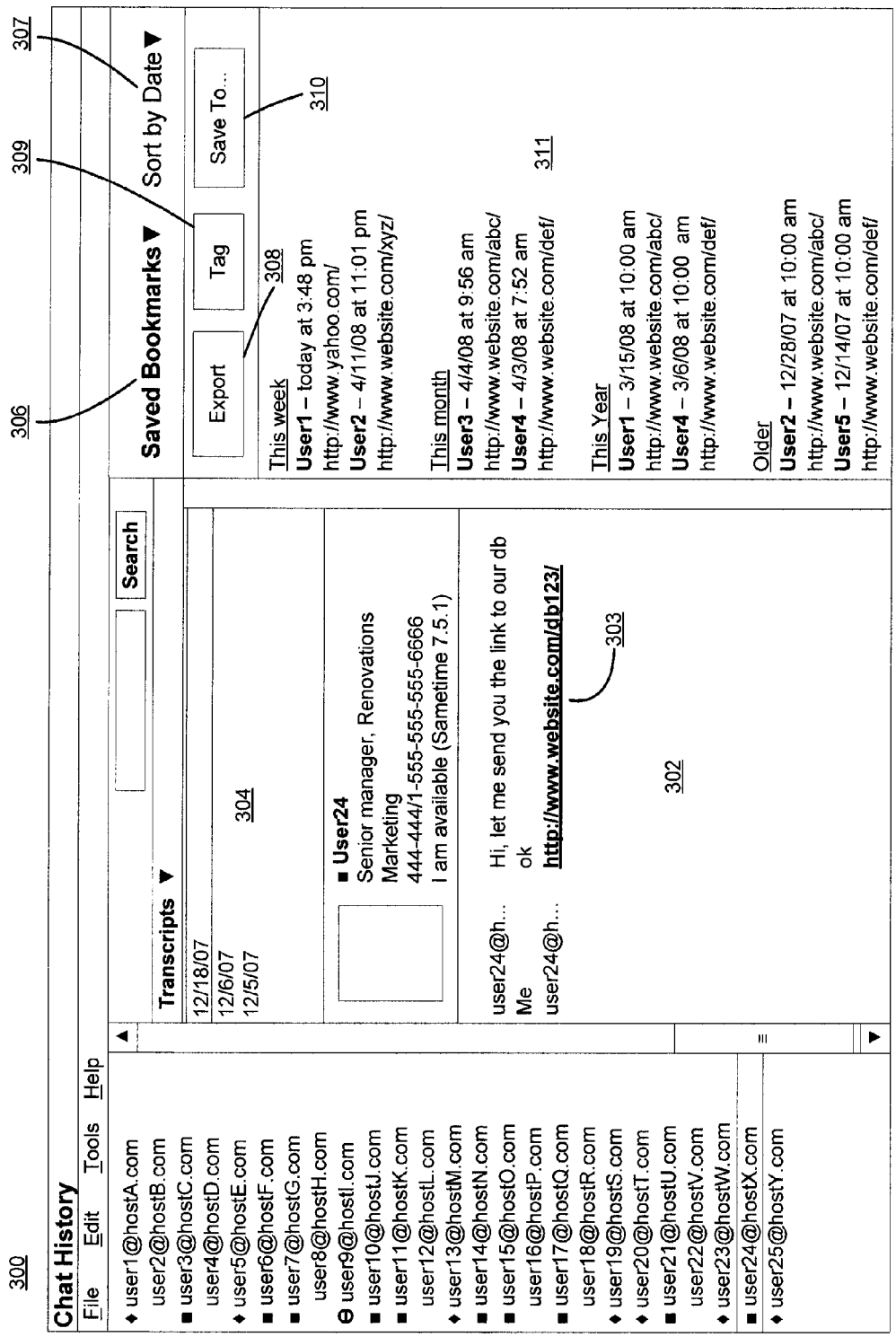
FIG. 3 illustrates an embodiment of an instant messaging system incorporating content aggregation.

FIG. 3 shows an embodiment of an instant messaging history display 300 incorporating content aggregation. Instant messaging display 300 comprises contact list 301 and chat window 302. Contact list 301 shows the names of contacts of the user, and may indicate a status (such as "available", "idle", "busy") of individual contacts by an icon located adjacent to a contact's name. Chat window 302 shows a logged conversation with a particular contact (in the embodiment of FIG. 3, "user24@hostX.com"). The logged conversation shown in chat window 302 comprises URL 303. Transcript drop down 304 allows a user to choose logged conversations from a particular date for viewing. Aggregator panel 305 is shown to the right of chat window 302. Aggregator panel 305 comprises a content type drop-down menu 306, a sort by drop-down menu 307, an export button 308, a tag button 309, a save to button 310, and a list of aggregated content 311. Because "Saved Bookmarks" is selected in content type drop-down menu 306, list of aggregated content 311 displays bookmarks found in the user's logged instant messaging conversations. As "Sort by Date" is selected in sort by drop-down menu 307, the aggregated bookmarks shown in list of aggregated content 311 are further organized by date.

FIG. 4 shows an embodiment of instant messaging history display 400 incorporating content aggregation. In the embodiment of FIG. 4, "Sort by Person" is selected in sort-by drop down menu 407. The aggregated bookmarks shown in list of aggregated content 411 are, accordingly, sorted by contact (including, in this embodiment, "User1", "User2", and "User3").

Figure 5:
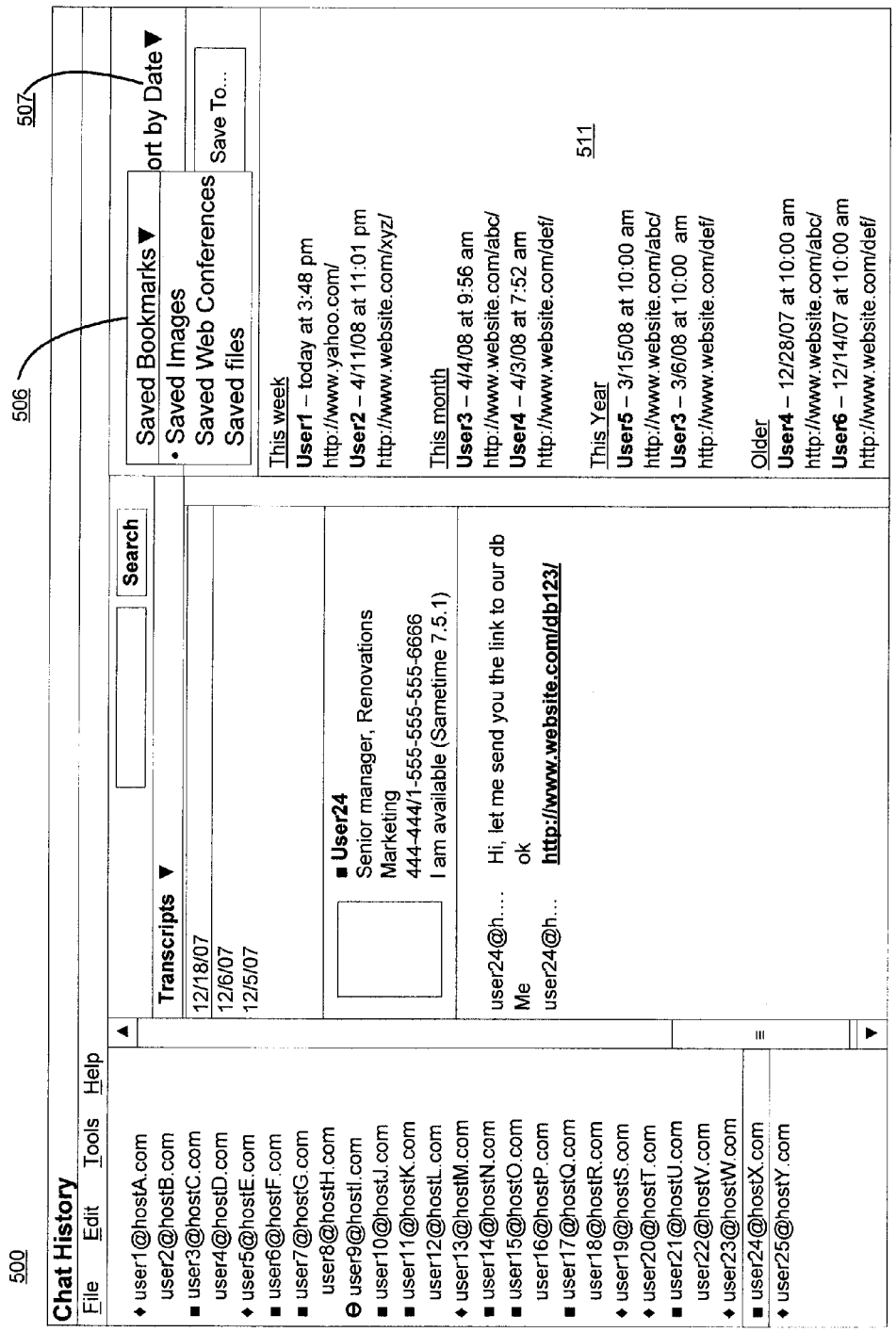
FIG. 5 illustrates an embodiment of an instant messaging system incorporating content aggregation.

FIG. 5 shows an embodiment of instant messaging history display 500 incorporating content aggregation. In the embodiment of FIG. 5, content type drop-down menu 506 shows types of content that may be aggregated, including bookmarks, images, web conferences, and files. Bookmarks are selected in content type drop-down menu 506, and "Sort by Date" is selected in sort by drop-down menu 507, so list of aggregated content 511 displays bookmarks found in the user's logged instant messenger conversations, sorted by date.

Figure 6:
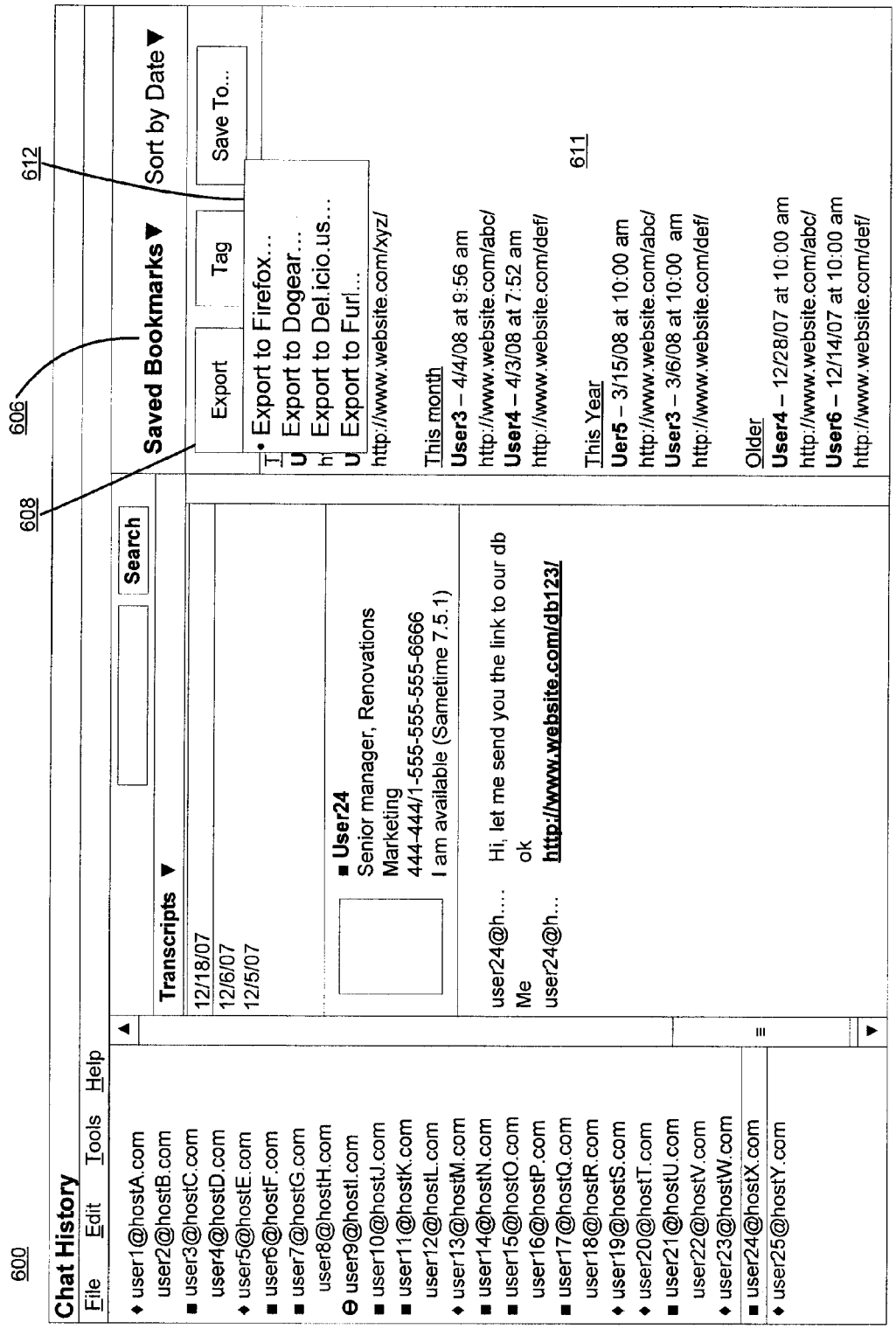
FIG. 6 illustrates an embodiment of an instant messaging system incorporating content aggregation.

FIG. 6 shows an embodiment of instant messaging history display 600 incorporating content aggregation. FIG. 6 shows export dialog 612, which is displayed to the user when export button 608 is selected. Export dialog 612 offers the user the option to export a selected bookmark from aggregated content list 611 to firefox's bookmark menu, to dogear, to Del.i-co.us, or to Furl. The options offered to the user by the export dialog 612 may be configurable by the user, and may vary based on the type of content selected in the content type drop-down menu 606.

Figure 7:
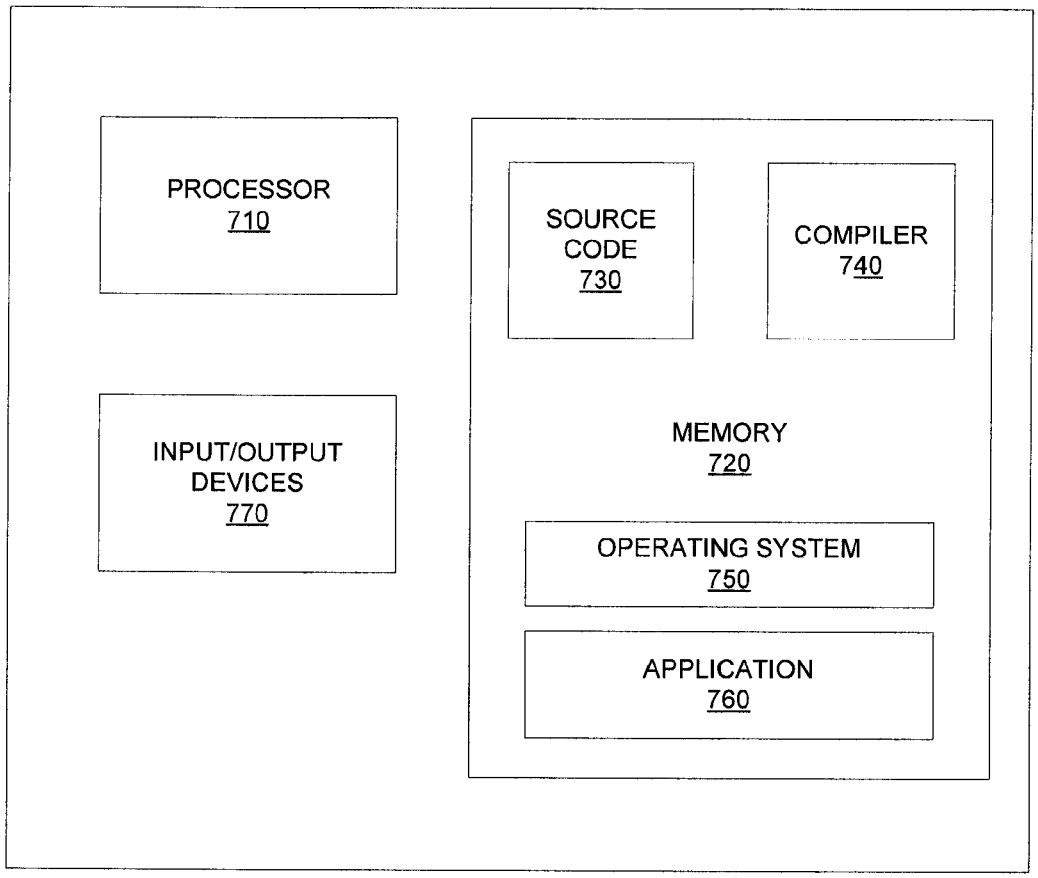
FIG. 7 illustrates an embodiment of a computer that may be used in conjunction with systems and methods for content aggregation in an instant messaging system.

FIG. 7 illustrates an example of a computer 700 having capabilities, which may be utilized by exemplary embodiments of systems and methods for content aggregation in an instant messaging system as embodied in software. Various operations discussed above may utilize the capabilities of the computer 700. One or more of the capabilities of the computer 700 may be incorporated in any element, module, application, and/or component discussed herein.

The computer 700 includes, but is not limited to, PCs, workstations, laptops, PDAs, palm devices, servers, storages, and the like. Generally, in terms of hardware architecture, the computer 700 may include one or more processors 710, memory 720, and one or more input and/or output (I/O) devices 770 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 is a hardware device for executing software that can be stored in the memory 720. The processor 710 can be virtually any custom made or commercially available processor, a central processing unit (CPU), a data signal processor (DSP), or an auxiliary processor among several processors associated with the computer 700, and the processor 710 may be a semiconductor based microprocessor (in the form of a microchip) or a macroprocessor.

The memory 720 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 720 may incorporate electronic, magnetic, optical, and/or other types of storage media. Note that the memory 720 can have a distributed architecture, where various components are situated remote from one another, but can be accessed by the processor 710.

The software in the memory 720 may include one or more separate programs, each of which comprises an ordered listing of executable instructions for implementing logical functions. The software in the memory 720 includes a suitable operating system (O/S) 750, compiler 740, source code 730, and one or more applications 760 in accordance with exemplary embodiments. As illustrated, the application 760 comprises numerous functional components for implementing the features and operations of the exemplary embodiments. The application 760 of the computer 700 may represent various applications, computational units, logic, functional units, processes, operations, virtual entities, and/or modules in accordance with exemplary embodiments, but the application 760 is not meant to be a limitation.

The operating system 750 controls the execution of other computer programs, and provides scheduling, input-output control, file and data management, memory management, and communication control and related services. It is contemplated by the inventors that the application 760 for implementing exemplary embodiments may be applicable on all commercially available operating systems.

Application 760 may be a source program, executable program (object code), script, or any other entity comprising a set of instructions to be performed. When a source program, then the program is usually translated via a compiler (such as the compiler 740), assembler, interpreter, or the like, which may or may not be included within the memory 720, so as to operate properly in connection with the O/S 750. Furthermore, the application 760 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 770 may include input devices such as, for example but not limited to, a mouse, keyboard, scanner, microphone, camera, etc. Furthermore, the I/O devices 770 may also include output devices, for example but not limited to a printer, display, etc. Finally, the I/O devices 770 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 770 also include components for communicating over various networks, such as the Internet or intranet.

If the computer 700 is a PC, workstation, intelligent device or the like, the software in the memory 720 may further include a basic input output system (BIOS) (omitted for simplicity). The BIOS is a set of essential software routines that initialize and test hardware at startup, start the O/S 750, and support the transfer of data among the hardware devices. The BIOS is stored in some type of read-only-memory, such as ROM, PROM, EPROM, EEPROM or the like, so that the BIOS can be executed when the computer 700 is activated.

When the computer 700 is in operation, the processor 710 is configured to execute software stored within the memory 720, to communicate data to and from the memory 720, and to generally control operations of the computer 700 pursuant to the software. The application 760 and the O/S 750 are read, in whole or in part, by the processor 710, perhaps buffered within the processor 710, and then executed.

When the application 760 is implemented in software it should be noted that the application 760 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 760 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 760 is implemented in hardware, the application 760 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include the ability to quickly locate and perform actions regarding various types of content stored in an instant messaging log.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for content aggregation in an instant messaging system, the method comprising:
    locating content of a specified type in an instant messaging log of the instant messaging system, wherein the specified type comprises a uniform resource locator (URL);
    organizing the located content of the specified type by a parameter, wherein the parameter includes one of sender and date received;
    displaying the organized content of the specified type;

performing an action regarding a selected piece of the displayed content of the specified type, wherein the action comprises one of exporting, saving, uploading, tagging, and forwarding the piece of the displayed content;

locating second content of a second specified type in the instant messaging log, wherein the second specified type includes one of Lotus Notes database URLs, web conference URLs, web conference passwords, phone numbers, audio conferences, audio conference passcodes, images, audio files, video files, and shared folders;

organizing the second located content of the second specified type by a parameter, wherein the parameter includes one of sender and date received;

displaying the organized second content of the second specified type; and performing an action regarding a selected piece of the displayed content of the second specified type, wherein the action comprises one of exporting, saving, uploading, tagging, and forwarding the piece of the displayed content of the second specified type.

2. The method of claim 1, wherein the selected piece of the displayed content is selected by a user, and wherein the action is selected by the user.

3. The method of claim 1, wherein the first and second specified type are selected by a user.

4. The method of claim 1, wherein the parameter is selected by a user, and wherein the action is selected by the user.

5. A system for content aggregation in an instant messaging system, the system comprising:

an aggregation module configured to locate content of a specified type in an instant messaging log of the instant messaging system, wherein the specified type comprises a uniform resource locator (URL); and a display module configured to organize the located content of the specified type by a parameter and to display the organized content, wherein the parameter includes one of sender and date received; and an action module configured to perform an action regarding a selected piece of the displayed content of the specified type, wherein the action comprises one of exporting, saving, uploading, tagging, and forwarding the piece of the displayed content;

wherein the aggregation module is further configured to locate content of a second specified type, wherein the second specified type includes one of Lotus Notes database URLs, web conference URLs, web conference passwords, phone numbers, audio conferences, audio conference passcodes, images, audio files, video files, and shared folders;

wherein the display module is further configured to organize the second located content of the second specified type by a parameter, wherein the parameter includes one of sender and date received and to display the organized second content of the second specified type; and wherein the action module is further configured to perform an action regarding a selected piece of the displayed content of the second specified type, wherein the action comprises one of exporting, saving, uploading, tagging, and forwarding the piece of the displayed content of the second specified type.

6. The system of claim 5, wherein the selected piece of the displayed content is selected by a user, and wherein the action is selected by the user.

7. The system of claim 5, wherein the parameter is selected by a user, and wherein the action is selected by the user.

8. A computer program product comprising a computer readable storage medium containing computer code that, when executed by a computer, implements a method for content aggregation in an instant messaging system, wherein the method comprises:

locating content of a specified type in an instant messaging log of the instant messaging system, wherein the specified type comprises a uniform resource locator (URL);

organizing the located content of the specified type by a parameter, wherein the parameter includes one of sender and date received;

displaying the organized content of the specified type;

performing an action regarding a selected piece of the displayed content of the specified type, wherein the action comprises one of exporting, saving, uploading, tagging, and forwarding the piece of the displayed content;

locating second content of a second specified type in the instant messaging log, wherein the second specified type includes one of Lotus Notes database URLs, web conference URLs, web conference passwords, phone numbers, audio conferences, audio conference passcodes, images, audio files, video files, and shared folders;

organizing the second located content of the second specified type by a parameter, wherein the parameter includes one of sender and date received;

displaying the organized second content of the second specified type; and performing an action regarding a selected piece of the displayed content of the second specified type, wherein the action comprises one of exporting, saving, uploading, tagging, and forwarding the piece of the displayed content of the second specified type.

* * * * *